(12) United States Patent
Mundra et al.

(10) Patent No.: US 7,177,401 B2
(45) Date of Patent: Feb. 13, 2007

(54) TTY COMMUNICATION OVER PACKET NETWORKS

(75) Inventors: Satish Kumar M. Mundra, Germantown, MD (US); David A. Lide, Rockville, MD (US); Edward N. George, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/050,049

(22) Filed: Feb. 3, 2005

(65) Prior Publication Data

US 2006/0171510 A1    Aug. 3, 2006

(51) Int. Cl.
*H04M 11/00* (2006.01)

(52) U.S. Cl. ............... 379/52; 379/90.01; 375/352

(58) Field of Classification Search ........... 379/52, 379/90.01; 370/352
See application file for complete search history.

(56) References Cited

U.S. PATENT DOCUMENTS

| 6,421,425 | B1* | 7/2002 | Bossi et al. | 379/52 |
| 6,842,503 | B1* | 1/2005 | Wildfeuer | 379/52 |
| 2003/0076815 | A1* | 4/2003 | Miller et al. | 370/352 |
| 2004/0008667 | A1* | 1/2004 | Michaelis | 370/352 |
| 2004/0196961 | A1* | 10/2004 | Freundlich et al. | 379/52 |
| 2004/0228325 | A1* | 11/2004 | Hepworth et al. | 370/352 |
| 2005/0195801 | A1* | 9/2005 | Chu et al. | 370/352 |
| 2006/0007916 | A1* | 1/2006 | Jones et al. | 370/352 |

* cited by examiner

*Primary Examiner*—Stella Woo
(74) *Attorney, Agent, or Firm*—Steven A. Shaw; W. James Brady; Frederick J. Telecky, Jr.

(57) ABSTRACT

A system to enable TTY communication between a legacy TTY phone and an IP phone over a packet network using a TTY relay protocol established between the IP phone and a media gateway at a central office of the PSTN. The system may also use a voice over Internet Protocol gateway to connect a personal computer to the packet network instead of an IP phone to accomplish TTY communication between software on the computer and a legacy TTY phone.

16 Claims, 3 Drawing Sheets

TTY COMMUNICATION OVER PACKET NETWORKS

CROSS-REFERENCE TO RELATED APPLICATIONS

None

FIELD OF THE INVENTION

The present invention relates to using an Internet Protocol compatible telephone to transmit real-time text communication in teletypewriter (TTY) mode.

BACKGROUND OF THE INVENTION

In a voice over Internet Protocol (VOIP) network infrastructure, traditional POTS (Plain Old Telephone Service) phones are replaced by new digital phones, called "IP phones," which connect to a packet network (cabled or wireless) with protocols similar to a conventional personal computer (PC) or other packet network-compatible computing device. IP phones have different protocols of operation than traditional phones ,and standards have not yet been developed for specialized uses, such as the transmission of real-time text communication in teletypewriter (TTY) mode for IP phones.

A TTY (teletypewriter) phone, also called text telephones, are devices that are designed to transmit and receive text messages over the public switched telephone network (PSTN.) They permit a person with a hearing or speech impairment to communicate in real-time over the PSTN. A deaf scientist, Robert Weitbrecht, is credited with the development of the TTY in the 1960s. A teletypewriter is an input device that allows alphanumeric character to be entered and transmitted in real-time to a remote TTY device or printer. The Teletype Corporation developed the teletypewriter, which was an early interface to computers. Teletype mode is the capability of a computing device to handle teletypewriter input and output. TTY can transmit a single character or lines of characters in real-time.

Modern TTY phones generally comprise a keyboard, similar to that of a typewriter, and a text display. Older TTY phones might use a printing device to display incoming text rather than a display. The TTY may have a cradle to couple to a standard telephone handset, but more likely it has a direct connection to the PSTN via a standard RJ11 port.

A TTY user typically initiates a call by dialing the destination phone number. When a connection is achieved, the user types his message on the TTY keyboard. The text characters are immediately encoded using a voiceband encoding scheme and transmitted over the PSTN to the destination device. If the destination device is another TTY, that TTY decodes the text message and displays it for the recipient. If the destination device is not another TTY device, the user requires assistance from a third party, such as an operator. In such a situation, the TTY user must dial the third party, and request that person dial the destination device. The TTY user must transmit the message to the third party, who then relays the message to the final recipient by reading it aloud. The encoded voice signal of the intermediary is subsequently transmitted over the PSTN to the intended recipient. Similarly, in order to receive an incoming call from a standard telephone user, the TTY user must rely on a third party to intercept the voice message and translate onto a TTY device.

Each time a user types a key on the TTY, the information is encoded for transmission over the PSTN. The exact encoding algorithm can vary from TTY device to TTY device, with at least six known legacy algorithms in operation in various countries. The legacy algorithms are often incompatible with each other, which further limits a TTY user's ability to communicate. The six existing legacy algorithms are Baudot, EDT, DTMF, V.21, Minitel, and Bell103. In order to mitigate the legacy interoperability problem, the International Telecommunications Union (ITU) has advanced a newer standard, known as ITU-T V.18. The V.18 standard includes procedures for automoding, interworking, modulation and protocol conversion so that various legacy-mode TTY's may be able to communicate with a V.18 TTY. The V.18 standard also permits simultaneous voice and text communication. All future TTY's are expected to migrate to the V.18 standard.

In addition to the PSTN, voice communication can occur over packet networks, such as the Internet, using an IP phone or IP phone emulation software on a personal computer. The protocols for such communication is referred to as Voice Over Internet Protocol (VOIP). In a VOIP call, the device at either end of the communication link may be either a traditional telephone or a VOIP phone. An example of networks and components for a VoIP call is illustrated in FIG. 1. Access network 10 could be any network accessing the Internet such as an IP, Asynchronous Transfer Mode (ATM), or Ethernet network, which is a managed broadband network. Network 10 comprises a router 14 connected to various customer premise equipment and to media gateway 12. Media gateway 12 must be capable of detecting changing resource or network conditions. The ability to detect and monitor changing resource and network conditions can result in significant cost reductions and/or improved quality. Router 14 is connected to Internet Access Device (IAD) 16, wireless access point (AP) 22, and/or IP PBX (personal branch exchange) 23. A voice call may be placed between any of the customer equipment phones 18 connected to IAD 16, wireless IP phone 24 connected to AP 22, or IP PBX phone 30. Using special software, calls could also be placed through computer 20 connected to IAD 16 or portable computer 26 connected to AP 22.

Customer equipment is connected through access broadband network 10 to the Internet 34 by media gateway 12. On the far end is the PSTN 48, networking to POTS phone 52 through a Central Office 50. PSTN is also connected to the Internet 34 through a trunk gateway, composed of signal gateway 46, media gateway controller/proxy (MGC) 32, and trunk media gateway (MG) 42. IP and packet data 28 (e.g., real time protocol (RTP packet data)) associated with the call is routed between IAD 16 and trunk MG 42. The trunk gateway system provides real-time two-way communications interfaces between the IP network (e.g., the Internet) and the PSTN 48. Calls could also be placed between IP phone 40 through AP 38 and media gateway 36 and any of the customer phones through router 14.

However, when the transmission medium is a call between people with speech and hearing impairments is an IP network, or when a traditional TTY phone is connected to a VOIP gateway in order to receive IP calls, the signals can suffer from many impairments including incompatibility of TTY legacy protocols with IP network and IP phone protocols.

SUMMARY

The limitations of the prior art are overcome by the present invention's technique for enabling IP phones and VOIP gateways with TTY capability. TTY-enabled IP phones can communicate with, and establish TTY text communication between, the IP phone and another TTY-enabled IP phone or traditional TTY phone.

Any device that is a source or destination for information that is transmitted over a digital communication network is known as digital circuit terminating equipment (DCE.) Examples of DCE's include text telephones (TTY's), VoIP phones, and personal computers. The present invention provides a method for communicating between two or more DCE's wherein at least one of the DCE's is a TTY device and at least one leg of the communication path is a packet network, such as the Internet. The TTY device is connected to the PSTN, which is in turn connected to a VOIP GW. The VOIP GW performs the function of translating the encoded information from the TTY to encoded information suitable for transmission over the packet network.

The present invention further provides a packetized virtual TTY capability that can be incorporated into a VOIP gateway or commercial carrier's media gateways. The packetized "virtual" TTY communications can interoperate with any of the legacy mode TTY phones by using TTY relay in a media gateway that is enabled with TTY relay capability.

BRIEF DESCRIPTION OF THE DRAWINGS

Preferred embodiments of the invention are discussed hereinafter in reference to the drawings, in which.

DETAILED DESCRIPTION OF PREFERRED EMBODIMENTS

The preferred embodiment of the present invention includes a system and method for enabling an IP (Internet Protocol) phone to function with TTY phone capabilities for compatibility with either a far-end IP phone with similar enablement or a traditional TTY phone connected to the PSTN.

Figure 2:
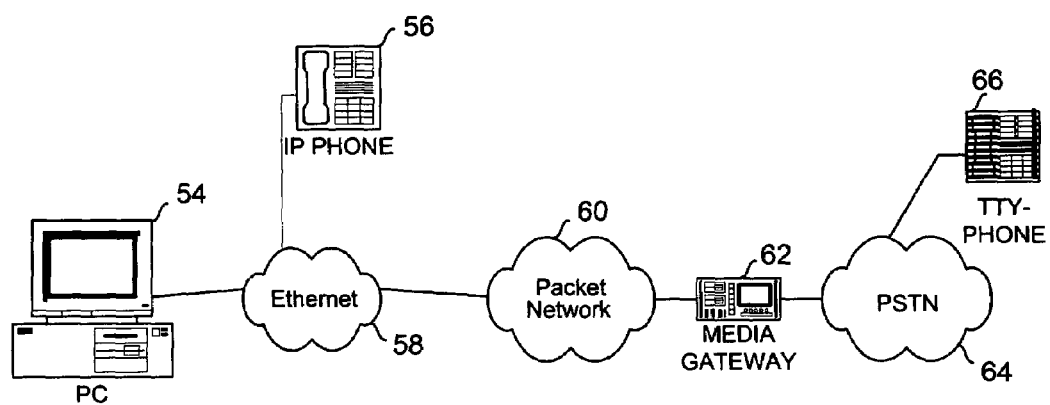
FIG. 2 illustrates a packet network enabled with TTY capability between an IP phone and a TTY telephone.
Figure 3:
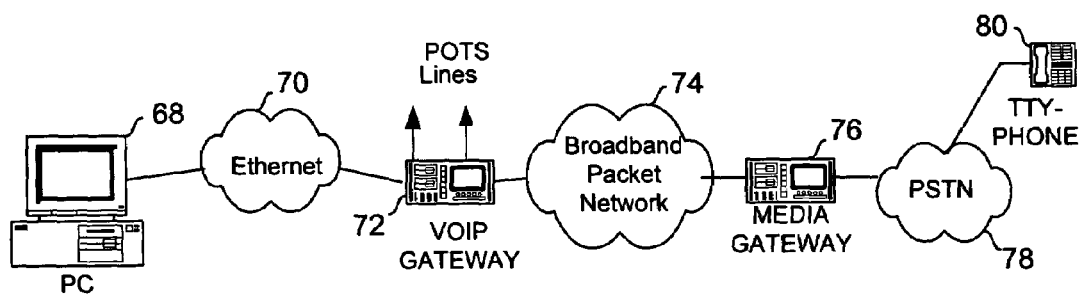
FIG. 3 illustrates a packet network enabled with TTY capability between a voice over Internet Protocol gateway and a media gateway at a central office.

FIG. 2 illustrates a network diagram that includes the IP phone 56 of the present invention connected to a traditional TTY phone 66. IP phone 56 is connected to a local area network 58 such as an Ethernet network. Also connected to Ethernet 58 is a personal computer (PC) 54. It is expected that most IP phones would be accompanied by a software control panel, which can operate on PC 54 and provide an alternate interface to the full functional capabilities of the IP phone 56 along with other useful management functions like phone book management, call history, billing information, voice quality, etc. IP phone software is enhanced such that, in conjunction with the soft panel, it can enable any IP phone 56 to function as a TTY phone. In an alternate embodiment, the display on IP phone 56 for text output could be used in conjunction with an enhanced alphanumeric keypad for text input. Such capability requires implementing the capabilities in DSP (Digital Signal Processor) software in accordance with ITU recommendation V.18.

Figure 1:
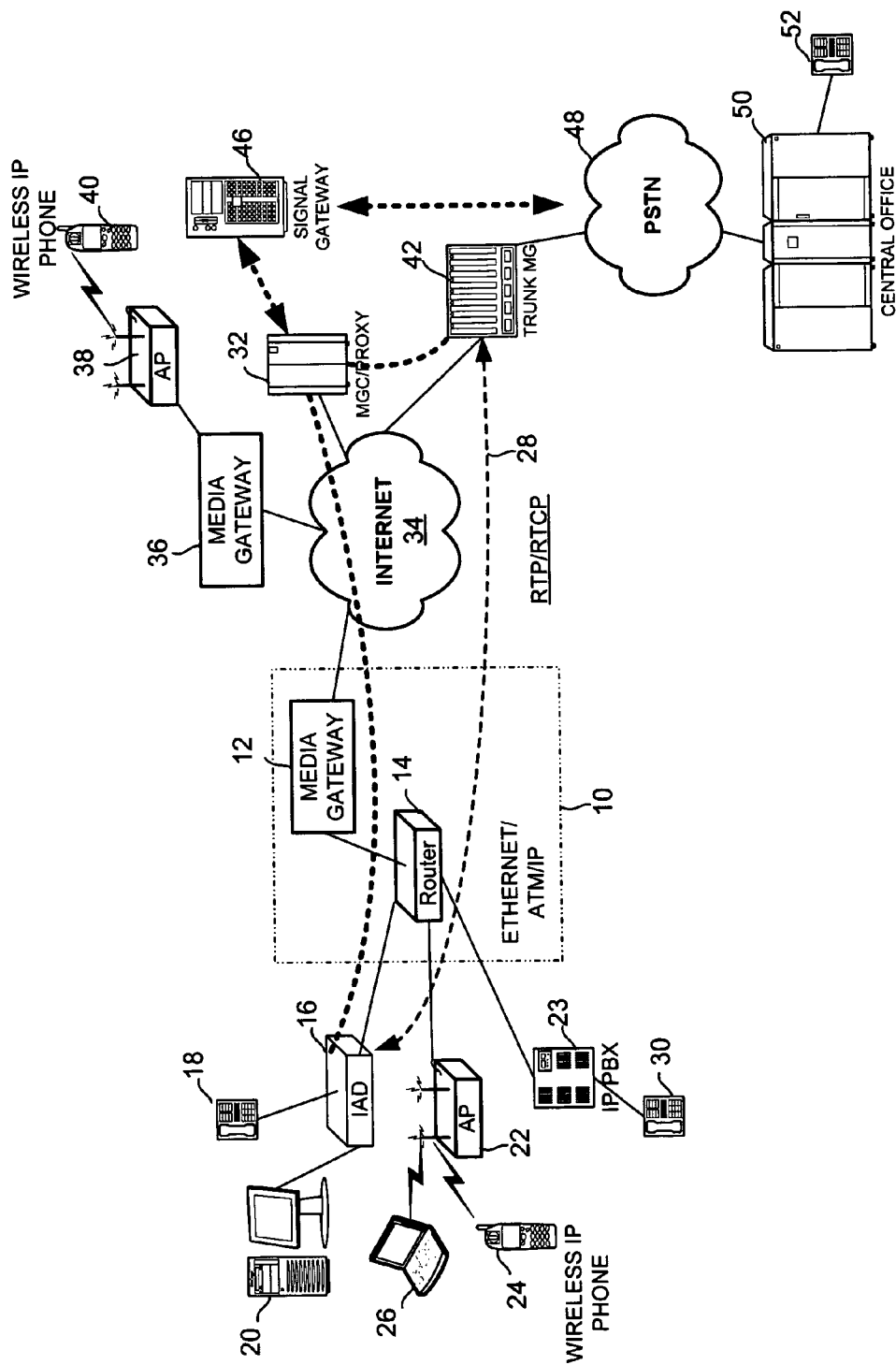
FIG. 1 illustrates a voice over Internet Protocol network.

IP phone 56 connects through Ethernet 58 to packet network 16, which can include a managed IP network or the Internet. PSTN 64 is connected to packet network 16 through a media gateway 62 at a central office, as described in reference to FIG. 1. MG 62 is enabled with TTY relay capability. Connected at the far-end to PSTN 64 is a traditional TTY-phone 66.

IP phone 56 is enabled to function as a TTY phone through the establishment of TTY relay protocol over the packet network and in MG 62. This is accomplished via the use of an out of band Session Description Protocol (SDP). Without any modem or automoding capabilities that are required in a TTY phone (e.g., V.18 or legacy), IP phone 56 can function as a virtual TTY phone and can take advantage of the capabilities of MG 62 in communicating to PSTN 64. MG 62 supporting TTY relay protocol decodes the TTY payload received from IP phone 56 to the selected TTY mode for communication with destination TTY phone 66. MG 62 also encodes the data received from TTY phone 66 into a packetized format suitable for transmission over packet network 16 to IP phone 56.

IP phone software on either PC 54 or IP phone 56 incorporates the capability to encode the text input from the IP phone keypad or PC keyboard into the packet format specified in Internet Engineering Task Force Request for Comments (IETF RFC) 2793, or another suitable packet format, for transmission over packet network 16. RFC 2793 specifies an Internet standards track protocol for the Internet community titled "RTP Payload for Text Conversation" and describes how to carry text conversation session contents in RTP packets. The IP phone software also decodes the received data for display on the IP phone 56 or in the soft panel window on PC 54.

When PC 54 is used for real-time text communication with TTY phone 66, the soft phone application on PC 54 and IP phone 56 jointly process the packet data to enable the TTY communication using a predefined TCP port for communication. When the IP phone 56 is on hook, IP phone 56 and PC 54 both run like a service or daemon listening on the TCP port for appropriate events such that TTY mode can be initiated whenever needed.

An alternative embodiment of the present invention comprises using a VOIP gateway connecting a personal computer to either directly to the PSTN or through a central office media gateway enabled with TTY relay capability. The alternative embodiment for TTY communication over a packet network allows universal communication between TTY Phones and VoIP phones regardless of lack of interoperability between traditional TTY phones and VOIP devices. FIG. 4 contains an illustrative diagram of network containing a VOIP gateway 72 with virtual TTY capability.

PC 68 operates a soft-phone application for TTY communications and connects to a broadband VOIP access gateway 72 through local area network (e.g., Ethernet network) 70. VOIP gateway 72 connects to a central office gateway 76 through a broadband packet network 82. This network configuration allows PC 68 to communicate directly with traditional TTY phone 80 through PSTN 78. In the alternative, VOIP gateway 72 may act as a residential gateway and provide access to TTY phone 80 through a direct connection to the PSTN 78.

The same software process for enabling TTY communication on IP Phone 56 is located on broadband VoIP gateway 72 and a Soft Phone Panel on PC 68, thereby providing a subscriber of VOIP service with TTY capability. The soft-phone application on PC 68 displays data that is received from VOIP gateway 72. PC 68 also transmits keyboard character input from PC 68 to VOIP gateway 72 for further transmission over the packet network 74 and eventually to far-end TTY phone 80. The transmission process is denominated as "TTY over Internet Protocol," or "TTYOIP." When a TTY call is handled from PC 68, the soft-phone application program on the PC displays data received from VOIP gateway 72 as well as transmits keyboard input from the PC 68 to VOIP gateway 72 for transmission over packet network 74 as specified TTYOIP.

A typical VOIP access gateway provides RJ-11 ports to connect a traditional phone or a TTY phone. VOIP gateway 72 requires a capability to function as a V.18 DCE so that it can perform the modulation/demodulation of TTY signal from/to the attached TTY phone for employing relay for transmission over packet network 74. By enabling the virtual TTY feature of the preferred embodiment, the VOIP gateway 72 implementation is simplified and cost is reduced.

The media gateway 76, interfacing to PSTN 78, implements DCE functionality specified in V.18 allowing it to automatically detect the mode of transmission. Media gateway 76 and VOIP gateway 72 employ the RTP payload format of the present invention for transmission of the text characters between them. Media gateways 72 and 76 can select the TTY mode of operation at each end of the network, independent of each other, allowing each to achieve interworking between various TTY legacy modes. Some carrierless legacy modes apart from V.18 native mode can support simultaneous voice and text communication and selected mode of transmission is indicated via Session Description Protocol.

Deployment of the enhanced TTY-capable IP phones and gateways will provide a cost advantage as no additional investment in wiring or traditional TTY devices would be required to support TTY communication capability. Currently, most organizations publish a separate number for TTY calls from customers and are required by law to do so. Virtual TTY capability enables any IP phone in an organization to function like a TTY phone, eliminating the need to publish a separate TTY number or provisioning a special line with a special TTY phone.

The virtual TTY of the present invention is a proposed new feature that can be incorporated into an IP phone system, broadband access gateways and a commercial carrier's gateway product lines. This feature would provide a competitive advantage to customers and provide them with product differentiation, minimizing the cost. The virtual TTY phone typically can interoperate with any type of legacy TTY mode phone by virtue of using TTY relay where only a gateway interfacing to PSTN typically needs such capability. Further, the present invention can be applied to peripheral devices for a TTY phone. A TTY answering machine typically consists of a printer attached to a TTY phone. Using the present invention, for an IP phone with virtual TTY capability, the answering machine operations for a TTY are simplified and be integrated with email. The capability to use both text and voice communication simultaneously can be used even for voice calls if the call is between two such IP phones. This will enhance the user experience by providing both voice and text communications effectively, even if the call is placed over a PSTN leg. Further, when both voice and text are used for communication, a new class of applications can be developed and can change interaction with various applications, such as Interactive Voice Response systems (IVRs), IP Private Branch Exchanges (PBXs), and voice mail and call centers.

The relay mechanism for TTY communication when such calls are carried over IP networks of the embodiments will result in saving bandwidth, improving reliability and interoperability among various incompatible TTY devices that are in use today.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A system for TTY communication over a packet network, comprising:
    an Internet Protocol (IP) phone connected to a packet network; and
    a TTY phone connected to said packet network through the public service telephone network (PSTN) and a media gateway,
    wherein said IP phone and said media gateway establish a TTY relay protocol over said packet network using an out of band session descriptor protocol, and
    said IP phone encodes and decodes TTY text characters into a real time protocol (RTP) packet format as text conversation session contents for transmission of the packetized text characters over said packet network.

2. The system of claim 1, further comprising:
    a personal computer, connected to said packet network, to jointly process said packetized text characters with said IP phone.

3. The system of claim 1, wherein said IP phone and said media gateway transmit said packetized text characters using a standard protocol for TTY character entry by said IP phone and said TTY phone.

4. The system of claim 1, further comprising:
    a personal computer, connected to said IP phone, wherein said personal computer operates a TTY-enabling software for said IP phone.

5. The system of claim 1, wherein said IP phone and said TTY phone connect a call using said TTY relay protocol.

6. The system of claim 1, wherein the IP phone and the TTY phone transmit over the packet network without using a special line for TTY transmissions.

7. A system for TTY communication over a packet network, comprising:
    a personal computer connected to a packet network through a voice over Internet Protocol (VOIP) gateway; and
    a TTY phone connected to said packet network through the public service telephone network (PSTN) and a media gateway;
    wherein said VOIP gateway and said media gateway establish a TTY relay protocol over said packet network using an out of band session descriptor protocol, and
    said VOIP gateway and said media gateway encode and decode TTY text characters into a real time protocol (RTP) packet format as text conversation session contents for transmission of the packetized text characters over said packet network.

8. The system of claim 7, further comprising:
    an IP phone, connected to said personal computer, to jointly process said packetized text characters.

9. The system of claim 8, wherein said IP phone and said TTY phone connect a call using said TTY relay protocol.

10. The system of claim 7, wherein said personal computer and said media gateway transmit said packetized text characters using a standard protocol for TTY character entry.

11. The system of claim 7, wherein the IP phone and the TTY phone transmit over the packet network without using a special line for TTY transmissions.

12. A method for TTY communication over a packet network, comprising:
- connecting a personal computer to a packet network through a voice over Internet Protocol (VOIP) gateway; and
- connecting a TTY phone to said packet network through the public service telephone network (PSTN) and a media gateway;
- establishing a TTY relay protocol over said packet network, between said VOIP gateway and said media gateway, using an out of band session descriptor protocol; and
- encoding and decoding TTY text characters, between said VOIP gateway and said media gateway, into a real time protocol (RTP) packet format as text conversation session contents for transmission of the packetized text characters over said packet network.

13. The system of claim 12, further comprising:
- connecting an IP phone to said personal computer to jointly process said packetized text characters.

14. The system of claim 12, wherein said personal computer and said media gateway transmit said packetized text characters using a standard protocol for TTY character entry.

15. The system of claim 12, wherein said IP phone and said TTY phone connect a call using said TTY relay protocol.

16. The method of claim 12, wherein the establishing further comprises transmitting the RTP packets between the IP phone and the TTY phone over the packet network without using a special line for TTY transmissions.

* * * * *